Jan. 20, 1925.

H. C. HANDWERGER

EYE TESTING INSTRUMENT

Filed July 11, 1924   2 Sheets-Sheet 2

1,523,769

WITNESSES
Oliver W. Holmes

INVENTOR
Harry C. Handwerger
BY
Knight Bros
ATTORNEYS

Patented Jan. 20, 1925.

1,523,769

UNITED STATES PATENT OFFICE.

HARRY C. HANDWERGER, OF NEW YORK, N. Y.

EYE-TESTING INSTRUMENT.

Application filed July 11, 1924. Serial No. 725,433.

*To all whom it may concern:*

Be it known that I, HARRY C. HANDWERGER, a citizen of the United States, and resident of the city, county, and State of New York, have invented certain new and useful Improvements in Eye-Testing Instruments, of which the following is a specification.

The invention relates to instruments for examining and testing eyes to obtain data from which suitable eye-glasses may be manufactured to correct defects in vision.

More particularly the invention relates to certain improvements intended to facilitate and amplify the operation of devices of this kind that are now manufactured.

Eye testing instruments have in general two sets of revolving disks carrying lenses of different powers of magnification. These disks are so arranged as to bring various lenses in front of the eyes of the person whose eye-sight is being tested. Suitable scales are also employed to indicate the various positions of the disks and consequently the character of the lenses. It is customary also to employ a second disk whose lenses are multiples in magnifying power of those of the primary disk, and suitable numbers on both disks registering through suitable orifices enable the observer to determine what the power of the combination of any two lenses is.

One object of my invention is to simplify this observation by doing away with the commutation involved in combining indicator numbers on two disks by employing a special indicating disk having throughout its circumference all the numbers involved in the commutations of the two sets of lenses, and by suitable gearing to rotate this indicating disk one complete revolution while the primary and secondary disks are revolved through their entire range. A suitable opening in the casing in front of the numbered disk exposing one number at a time enables the operator to read directly the value of any combination of lenses.

The invention further comprises means for increasing the range of that part of the instrument used for determining astigmatism. Ordinarily the instrument is equipped with additional disks carrying cylindrical lenses of various powers and these cylindrical lenses are mounted in gearings all geared to a common gear, so that the operator by turning the common gear can rotate all the cylindrical lenses and set them at any desired angularity, the gearing insuring that all the cylinders will have their axes register at the same angularity when they are in the sight position. It is in general common to have eight such cylindrical lenses and a blank. For ranges beyond the eight lenses it has been customary to insert in the suitable pocket on the instrument trial cylindrical lenses in order to increase the range. As I have found in practice that double the range of the existing set is sufficient for most purposes, my invention is directed to obviating the necessity of inserting the trial lenses by placing an additional cylindrical lens in a carrier, whereby said lenses can be moved into the range of the sight position and so gearing this additional lens to the gear train that operates the other lenses as to insure that it also shall have the same angularity of its axis when in the sight position as the other lenses.

In order that the invention may be fully understood it will first be described with reference to the accompanying drawings and afterwards more particularly pointed out in the annexed claims.

In said drawings:—

Figure 2:
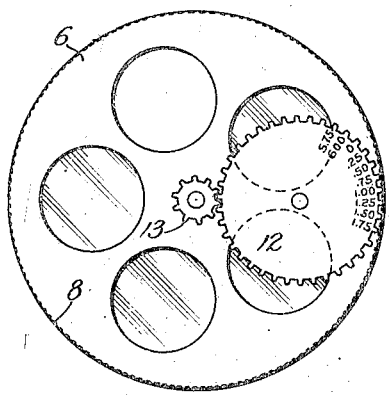
Figure 2 is a front view of the spherical lens disk showing the registering device.
Figure 3:
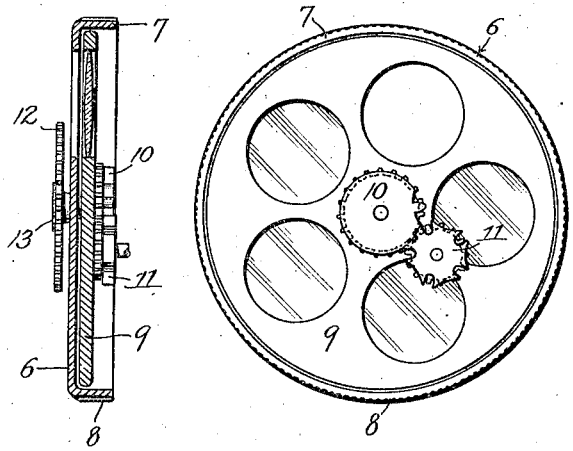
Figure 3 is a section through the spherical lense disk.
Figure 4:
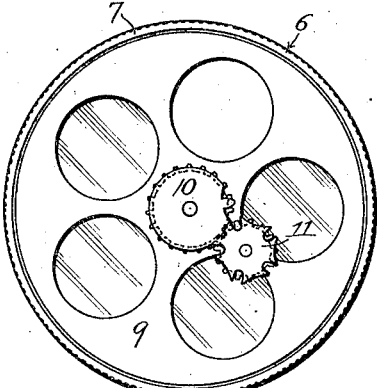
Figure 4 is a rear view of the secondary disk.

A stand 1 has supports 2 upon which are mounted face plates 3 and 4. The face plates have orifices 5 adapted to register with the eyes of a person. Behind the face plate 3 are mounted on central pivots disks 6 (see Figures 2, 3 and 4). These disks each have five apertures, one of which is open and the other four occupied by spherical lenses ranging in intensity from .25 to 1 dioptre. This disk 6 has a peripheral flange 7 milled at 8, whereby the operator may rotate the disk with his finger. Behind the disk 6 is a secondary disk 9, which also have five apertures, one blank and four with spherical lenses varying from 1.25 to 5.00 dioptres. These two disks are geared together by Geneva gears 10 and 11, as shown in Figure 4, so that the disk 9 will rotate only once to five revolutions of disk 6 and owing to the nature of the Geneva gears the disk 9 will remain stationary while each one of the orifices of the disk 6 are brought into the sight position.

Figure 1:
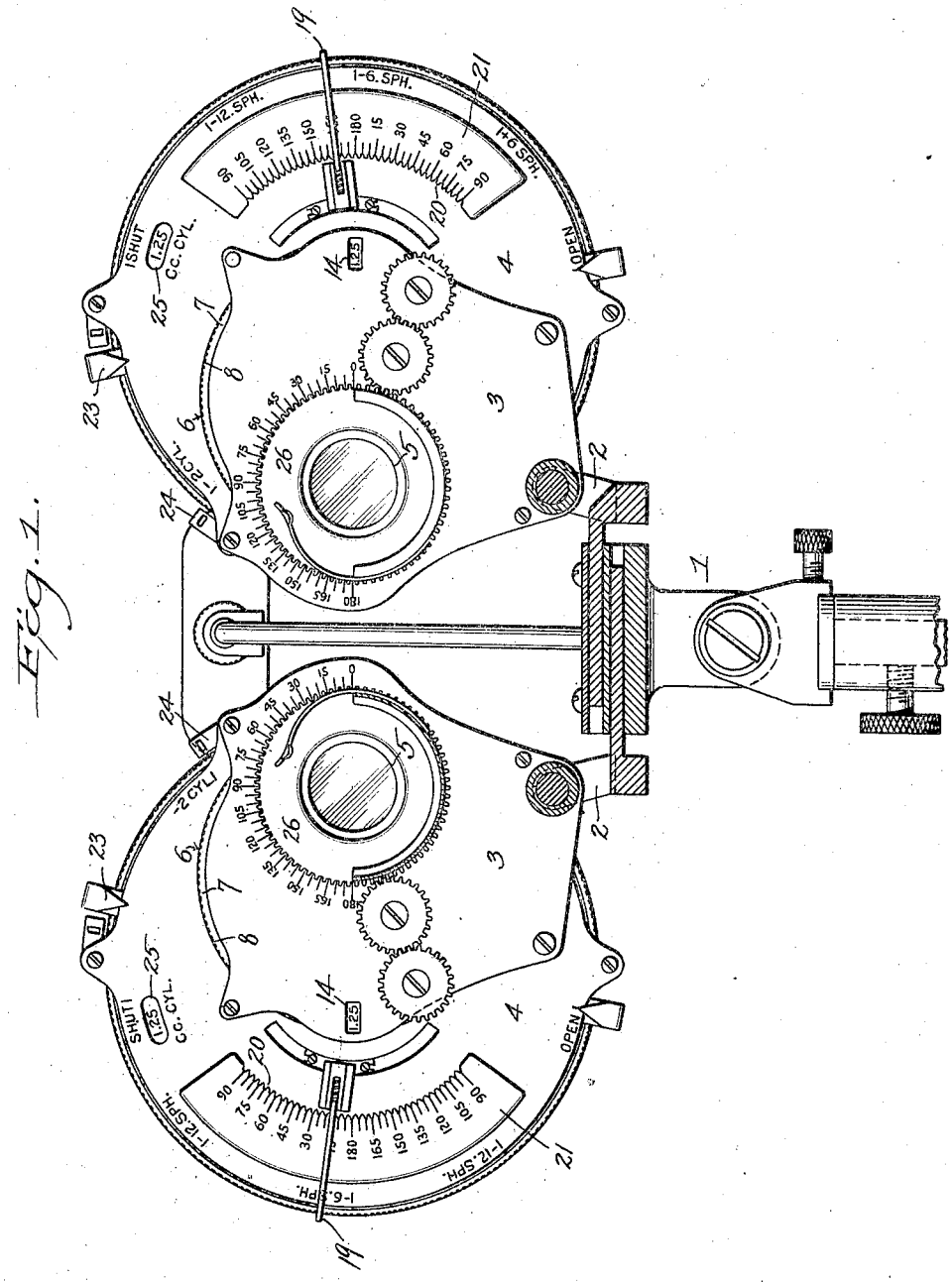
Figure 1 is a front elevation of an eye testing instrument.

In order to indicate the power of the lenses occupying the sight position, it has heretofore been customary to have openings between each of the lenses on the disk 6 through which figures on disk 9 could be observed, while an opening in the face plate 3 would also exhibit in juxta-position figures on disk 9 and other figures on disk 6 and the operator by observing both figures and adding one to the other could so combine them as to ascertain the power of the combined lenses. In my invention I do away with all such commutations and use instead an indicator wheel or disk 12 (see Figures 2 and 3), which has geared teeth on its periphery that mesh with a pinion 13 attached to the disk 6. The pinion 13 is one-fifth the diameter of the indicator wheel 12 so that the indicator wheel makes only one revolution while the two disks are passing through all their possible combinations. Near the periphery of the disk 12 are numbers which being viewed through an orifice 14 (see Figure 1) show at a glance the exact value of the lenses of each combination as it appears in the sight position. There is, by this direct reading, obtained a much greater facility of operation and a less liability to err in recording the result of the operations.

Figure 5:
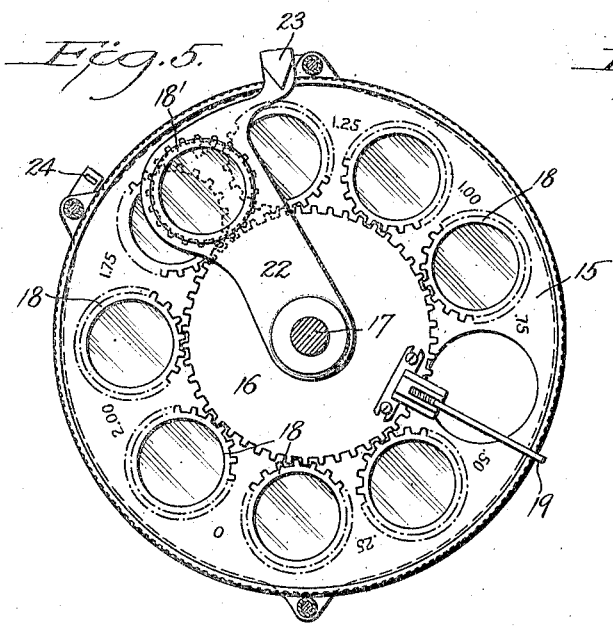
Figure 5 is a front view of the disk carrying the cylindrical lenses.
Figure 6:
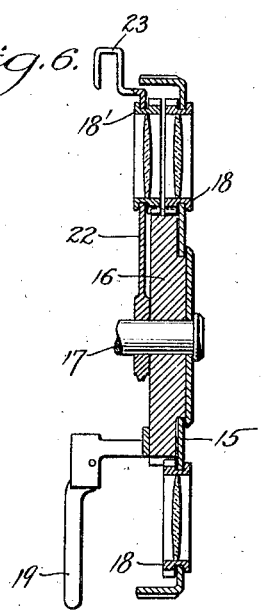
Figure 6 is a vertical section of the same.

At the rear of the face plate 4 is a disk 15 for carrying cylindrical lenses, as shown in Figure 5. Having once determined the proper angularity of the axis of the cylindrical lens for the kind of observation it is desired to make, it is desirable that each lens brought into the line of sight shall have the same angularity. To this end a gear wheel 16 is mounted adjustably on the axis 17 and each lens is carried in a gear ring 18, so that as the disk 15 is rotated with its lenses, the lenses are all turned so that as each comes into the line of sight it will have the same angle as any other of the lenses of the set would have. The gear 16 is adjusted on the axis 17 to change the angularity of the cylindrical lenses by means of a pivot lever 19 secured to it, which lever may be moved out of and into engagement with teeth 20 of a segment 21 on the face plate 4, so as to be set opposite the numbers shown on such segments which indicates the degree of angularity.

In order to increase the range of this part of the instrument, I employ an adjustable arm 22 also pivoted on the axis 17 which carries a lens set in a gear ring 18' which also meshes with the gear 16 in such a way that when the arm 22 is moved by the operator putting his finger on the pointer 23 as to bring the lens into the line of sight, the axis of the cylindrical lens carried by the arm 22 will correspond with the axis of the other lenses that are carried in the disk 15. When moved into this position pointer 23 on the arm engages with a spring catch 24 which holds it securely in position in the line of sight, while the disk 15 is moved around. The cylindrical lenses on disk 15 vary from 0 to 2 dioptres by quarters, as shown by figures on the face of the disk. The auxiliary second cylinder lens carried by arm 22 would have a power of 2.00 and by its use the range of the instrument is, therefore, doubled. The figures on the disk 15 are made visible through an orifice in face plate 4, as shown at 25 and I prefer to have this orifice located at the upper part of the face plate 4 intsead of at the lower part as has heretofore been the practice in order that it may be more easily read. Should greater powers of other spherical or cylindrical lenses be required they may be inserted in outside holders shown at 26.

I claim:

1. In an instrument for recording the value of combinations of lenses, the combination of two lens carrying disks rotatable on a common axis and connected by an intermittent gear, of an indicating disk geared to the lens carrying disks and carrying on its face a column of numbers representing the value of the combinations of lenses.

2. In an instrument for recording the value of combinations of lenses, the combination of two lens carrying disks rotatable on a common axis and connected by an intermittent gear, of an indicating disk geared to the lens carrying disks and carrying on its face a column of numbers representing the value of the combinations of lenses, a face plate covering the disks and gears and having a sight orifice and a number orifice located so that only the number corresponding to the combination of lenses in line with the sight orifice will be visible.

3. In a device of the character described, the combination with the disk carrying cylindrical lenses, of a gear for rotating all the lenses on the disk simultaneously, and a supplemental lens carrier movable into and out of the line of sight and also provided with a gear meshing with the gear for rotating the lenses whereby the supplemental lens will be rotated uniformly with the other lenses.

HARRY C. HANDWERGER.